US009615404B2

United States Patent
Takada et al.

(10) Patent No.: US 9,615,404 B2
(45) Date of Patent: Apr. 4, 2017

(54) CONSUMABLE ELECTRODE ARC WELDING METHOD

(71) Applicant: DAIHEN Corporation, Osaka-shi, Osaka (JP)

(72) Inventors: Kento Takada, Osaka (JP); Toshiaki Nakamata, Osaka (JP)

(73) Assignee: DAIHEN Corporation, Osaka (JP)

( * ) Notice: Subject to any disclaimer, the term of this patent is extended or adjusted under 35 U.S.C. 154(b) by 447 days.

(21) Appl. No.: 13/949,769

(22) Filed: Jul. 24, 2013

(65) Prior Publication Data

US 2014/0027423 A1   Jan. 30, 2014

(30) Foreign Application Priority Data

Jul. 30, 2012 (JP) ................. 2012-168004

(51) Int. Cl.
B23K 9/073 (2006.01)
H05B 1/02 (2006.01)

(52) U.S. Cl.
CPC .......... *H05B 1/0202* (2013.01); *B23K 9/073* (2013.01)

(58) Field of Classification Search
CPC . B23K 9/10; B23K 9/06; B23K 9/073; B23K 9/092
USPC ... 219/130.21, 130.4, 130.5, 130.51, 137 PS
See application file for complete search history.

(56) References Cited

U.S. PATENT DOCUMENTS

| 7,919,728 | B2 * | 4/2011 | Era | B23K 9/092 |
| | | | | 219/130.21 |
| 2005/0269306 | A1 * | 12/2005 | Fulmer | B23K 9/09 |
| | | | | 219/130.51 |
| 2006/0102698 | A1 * | 5/2006 | Ihde | B23K 9/124 |
| | | | | 228/101 |

FOREIGN PATENT DOCUMENTS

| JP | 7-51854 | 2/1995 |
| JP | 2006-281219 | 10/2006 |

OTHER PUBLICATIONS

Nov. 17, 2015 Machine Translation of JP2006-281219, 2006.*

* cited by examiner

*Primary Examiner* — Brian Jennison
(74) *Attorney, Agent, or Firm* — Hamre, Schumann, Mueller & Larson, P.C.

(57) ABSTRACT

A consumable electrode arc welding method includes the detecting of a constriction formed in a molten droplet of the welding wire so as to reduce the welding current, the detecting of a smoothed value of the welding current, and the feedback controlling of the feed rate of the welding wire so as to make the smoothed value of the welding current correspond to a predetermined current setting value. The constriction detection is performed repetitively in a predetermined cycle. In each time of the repetition, the length of a constriction time, from the constriction detection till the arc generation, is measured. The number of constriction time lengths falling outside a predetermined range is counted. When the counted number is not less than a reference number, the transient response time of the feedback control is made longer.

5 Claims, 3 Drawing Sheets

CONSUMABLE ELECTRODE ARC WELDING METHOD

BACKGROUND OF THE INVENTION

1. Field of the Invention

The present invention relates to a consumable electrode arc welding method. In particular, the present invention relates to constriction detection control and wire feed rate variable control in a consumable electrode arc welding method.

2. Description of the Related Art

JP-A-2006-281219 discloses a technique related to consumable electrode arc welding. In the conventional consumable electrode arc welding, an arc generating state and a short-circuiting state repetitively occur between a welding wire and a base material. As a premonitory sign of regeneration of an arc from a short-circuiting state, a constriction forms in a molten droplet. The formation of a constriction is detected based on a change in the voltage (or resistance) between the welding wire and the base material. When a constriction is detected, the welding current is reduced sharply so that an arc is generated in a low current. This constriction detection control reduces spattering during arc generation.

JP-A-7-51854 discloses a technique of variably controlling the feed rate of a welding wire to keep the welding current constant even when the distance between a power supply chip and the base material (hereinafter referred to as "chip-base distance") changes. Generally, the penetration depth of the base material is substantially proportional to the welding current. Thus, when the welding current is constant, the penetration depth is kept uniform, which leads to high welding quality. In ordinary arc welding, welding is performed with the chip-base distance kept constant. However, in the welding with a deep groove or multi-pass welding, it may be difficult to keep the chip-base distance constant due to e.g. problems such as contact of the welding torch and the base material. Even when the chip-base distance needs to be changed in this way, the technique disclosed in JP-A-7-51854 makes it possible to keep the welding current constant by variably controlling the feed rate, thereby preventing the penetration depth from varying.

In performing welding, both of the above-described feed rate variable control and constriction detection control can be employed at the same time. However, when the feed rate is rapidly changed by variable control, the state of constriction formed in a molten droplet changes. This hinders proper constriction detection control and results in unstable welding state. Conventionally, therefore, when feed rate variable control is performed, constriction detection control is not performed, which, however, increases the spattering.

SUMMARY OF THE INVENTION

It is, therefore, an object of the present invention to provide a consumable electrode arc welding method which is capable of maintaining a stable welding state even when welding constriction detection control and feed rate variable control are executed at the same time.

A consumable electrode arc welding method according to an embodiment of the present invention includes a constriction detection step, a smoothed value detection step and a feedback step. In the constriction detection step, a welding wire and a base material are short-circuited, a constriction formed in a molten droplet of the welding wire is detected, a welding current through the welding wire and the base material is reduced based on the detection of the constriction and an arc is caused to generate between the welding wire and the base material after the welding current is reduced. In the smoothed value detection step, a smoothed value of the welding current is detected. In the feedback step, a feed rate of the welding wire is feedback controlled so that the smoothed value of the welding current corresponds to a predetermined current setting value. The constriction detection step is performed repetitively in a predetermined cycle and in each time of repetition a constriction time length from when the constriction is detected till when the arc is generated is measured. Of the constriction time lengths obtained in the predetermined cycle, the number of constriction time lengths falling outside a predetermined range is counted. The transient response time of the feedback control is set to a predetermined value when the counted number is smaller than a predetermined reference number and set to a value larger than the above-mentioned predetermined value when the counted number is not less than the reference number.

Preferably, the transient response time is set by changing the gain of the feedback control. Alternatively, the transient response time is set by changing the time constant of the smoothed value of the welding current.

According to the present invention, in performing welding while executing both of constriction detection control and feed rate variable control, the transient response time of feed rate variable control is set long (high speed transient response) at the start of the welding. When erroneous constriction detection occurs at a frequency higher than a predetermined frequency during the welding, the transient response time of feed rate variable control is set long (low speed transient response), thereby preventing adverse effect by improper operation of constriction detection control. According to this arrangement, when improper operation of constriction detection control does not occur, the transient response of feed rate variable control is at high speed. Thus, the effect of constriction detection control and feed rate variable control are achieved as much as possible. When improper operation of constriction detection control occurs, the transient response of feed rate variable control is changed to a low speed. This prevents unstable welding and poor welding quality.

DETAILED DESCRIPTION OF THE PREFERRED EMBODIMENTS

Preferred embodiments of the present invention are described below with reference to the accompanying drawings.

Figure 1:
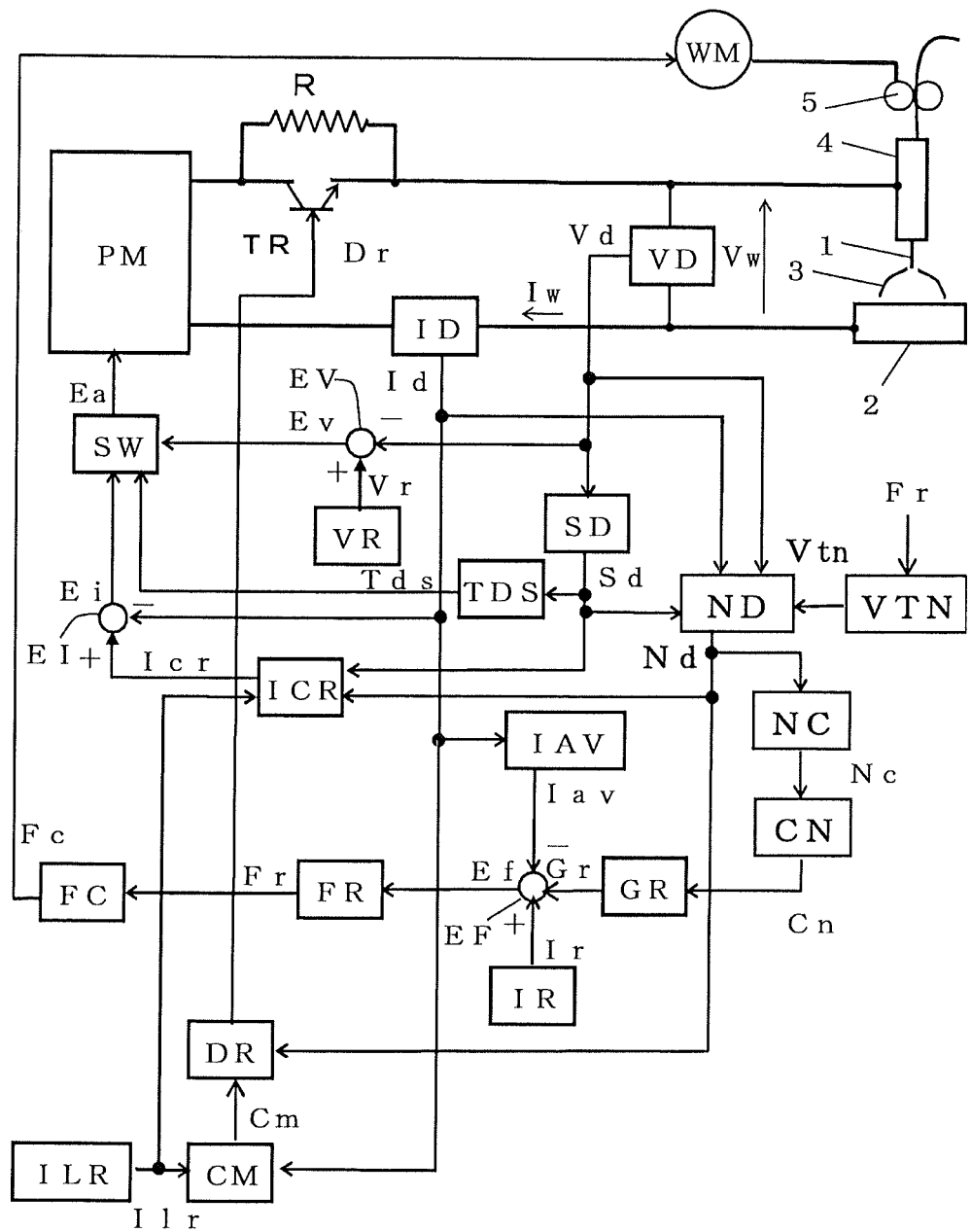
FIG. 1 is a block diagram of a welding power source for carrying out a consumable electrode arc welding method according to an embodiment of the present invention.

FIG. 1 is a block diagram of a welding power source for carrying out a consumable electrode arc welding method according to an embodiment of the present invention.

The welding power source includes a main circuit PM for connection to a three-phase, 200V or similar commercial power supply. The power source main circuit PM performs output control such as inverter control based on an error amplified signal Ea and outputs a welding voltage Vw and a welding current Iw to a welding torch 4 and a base material 2. The power source main circuit PM includes a primary rectifier for rectifying alternating current inputted from a commercial power supply, a smoothing capacitor for smoothing the direct current obtained by rectification, an inverter circuit for converting the smoothed direct current into a high-frequency alternating current, a high-frequency transformer for dropping the high-frequency alternating current into a voltage appropriate for welding, a secondary rectifier for converting the dropped high-frequency alternating current into a direct current, a reactor for smoothing the direct current obtained by rectification, a modulation circuit that takes the error amplified signal Ea as input to execute pulse width modulation control, and an inverter drive circuit that takes a pulse width modulation control signal as input to drive a switching element of the inverter circuit.

A current reducing resistor R is connected between the power source main circuit PM and the welding torch 4. The resistance of the current reducing resistor R is set to not less than ten times the short circuit load (about 0.01-0.03Ω), which may be e.g. about 0.5-3Ω. Thus, when the current reducing resistor R is inserted in the current path (which will be described later) by constriction detection control, the energy stored in the reactor for smoothing the direct current in the welding power source and a reactor of an external cable connecting the welding power source and the welding torch 4 is suddenly released, whereby an arc 3 is generated. The current reducing resistor R reduces the welding current during the generation of the arc. A transistor TR is connected in parallel to the current reducing resistor R. On/off control of the transistor TR is executed in accordance with a driving signal Dr.

A feed motor WM and a feed roller 5 connected to and driven by the feed motor WM are provided to feed a welding wire 1 through the welding torch 4. By the rotation of the feed roller 5, the welding wire 1 is fed through the welding torch 4. An arc 3 is generated between the welding wire 1 and the base material 2. A welding voltage Vw is applied between the welding wire 1 and the base material 2, and the welding current Iw flows through the arc 3. The welding voltage Vw is detected by a voltage detection circuit VD, and the voltage detection circuit VD outputs a voltage detection signal Vd.

A current detection circuit ID is connected between the base material 2 and the power source main circuit PM. The current detection circuit ID detects the welding current Iw and outputs a current detection signal Id. To the current detection circuit ID is connected a current smoothing circuit IAV. The current smoothing circuit IAV smoothes the inputted current detection signal Id and outputs a welding current smoothed signal Iav. This smoothing can be performed by using a smoothing circuit made up of a resistor and a capacitor, or a low-pass filter. When a low-pass filter is used, the time constant of the filter can be set by a cut-off frequency.

A short-circuit/arc determination circuit SD is connected to the voltage detection circuit VD and takes a voltage detection signal Vd as input. The short-circuit/arc determination circuit SD outputs a short-circuit/arc determination signal Sd in accordance with the voltage detection signal Vd. Specifically, when the value of the voltage detection signal Vd is lower than a predetermined short-circuit/arc determination value, the short-circuit/arc determination circuit SD determines that the welding wire 1 and the base material 2 are in the short-circuiting state and outputs a short-circuit/arc determination signal Sd of a high level. When the value of the voltage detection signal Vd is higher than (more precisely, equal to or higher than) the predetermined short-circuit/arc determination value, the short-circuit/arc determination circuit SD determines that an arc is generated and outputs a short-circuit/arc determination signal Sd of a low level.

The constriction reference value setting circuit VTN sets a proper constriction detection reference value depending on the welding conditions (e.g. the feed rate, welding method, material or diameter of the welding wire). In the illustrated example, the constriction reference value setting circuit VTN takes a feed rate setting signal Fr as input and outputs a constriction detection reference value signal Vtn based on a predetermined function. This function defines the relation between a feed rate setting signal Fr and a constriction detection reference value suitable for the feed rate setting signal and is calculated through experiments.

The constriction detection reference value signal Vtn is inputted into a constriction detection circuit ND. Into the constriction detection circuit ND are also inputted the voltage detection signal Vd, the current detection signal Id and the short-circuit/arc determination signal Sd. Based on these input signals, the constriction detection circuit ND outputs a constriction detection signal Nd of a low level or a high level. Specifically, in the case where the short-circuit/arc determination signal Sd is at high level (short-circuiting state), when the voltage detection signal Vd has reached the constriction detection reference value signal Vtn, the constriction detection circuit ND determines that a constriction is formed and outputs a detection signal Nd of a high level. On the other hand, when the short-circuit/arc determination signal Sd changes to a low level (arc generating state), the constriction detection circuit ND outputs a constriction detection signal Nd of a low level.

The above constriction detection signal Nd may be changed to a high level when the derivative of the voltage detection signal Vd in the short circuit period has reached a corresponding constriction detection reference value signal Vtn. Alternatively, the value of the voltage detection signal Vd may be divided by the value of the current detection signal Id to obtain the resistance of a molten droplet, and the constriction detection signal Nd may be changed to a high level when the derivative of the resistance has reached a corresponding constriction detection reference value signal Vtn.

The low level current setting circuit ILR outputs a predetermined low level current setting signal Ilr. The current comparator circuit CM takes as input the low level current setting signal Ilr and the current detection signal Id and outputs a current comparison signal Cm. The current comparison signal Cm becomes high level when Id<Ilr and becomes low level when Id≥Ilr.

The driver circuit DR takes as input the current comparison signal Cm and the constriction detection signal Nd and outputs a driving signal Dr. The driving signal Dr changes to a low level when the constriction detection signal Nd changes to a high level and thereafter changes to a high level when the current comparison signal Cm changes to a high level. The driving signal Dr is outputted to the base terminal of the transistor TR. When a constriction is detected, the driving signal Dr becomes a low level, whereby the transistor TR becomes the off-state. This makes the current reducing resistor R inserted in the current path, so that the welding current Iw flowing to the short circuit load sharply reduces. When the welding current Iw reduces to the value of the low level current setting signal Ilr, the driving signal Dr changes to a high level, whereby the transistor TR becomes the on-state. Thus, the current reducing resistor R is short-circuited.

The current control setting circuit ICR takes as input the short-circuit/arc determination signal Sd, the low level current setting signal Ilr and the constriction detection signal Nd and outputs a current control setting signal Icr that satisfies the conditions given below:

1) During a predetermined initial period from when the short-circuit/arc determination signal Sd changed to a high level (short circuit period), the current control setting signal Icr has a predetermined initial current setting value.

2) Thereafter, the current control setting signal Icr rises from the initial current setting value to a predetermined peak setting value with a predetermined short-circuit-time slope and then maintains the peak setting value.

3) When the constriction detection signal Nd changes to a high level (i.e., constriction is detected), the current control setting signal Icr changes to a value as a low level current setting signal Ilr and maintains this value.

4) When the short-circuit/arc determination signal Sd changes to a low level (arc period), the current control setting signal Icr rises to a predetermined high level current setting value with a predetermined arc-time slope and maintains the value.

The off delay circuit TDS takes as input the short-circuit/arc determination signal Sd and outputs a delay signal Tds. The delay signal Tds changes from a high level to a low level when a predetermined delay period has elapsed after the short-circuit/arc determination signal Sd changed from a high level to a low level. That is, the delay signal Tds is at high level during the short circuit period and changes to a low level when the delay period has elapsed since regeneration of an arc.

The voltage setting circuit VR outputs a predetermined voltage setting signal Vr for setting the welding voltage Vw during the arc period. The current error amplification circuit EI amplifies the error between the current control setting signal Icr(+) and the current detection signal Id(−) and outputs a current error amplification signal Ei. The voltage error amplification circuit EV amplifies the error between the voltage setting signal Vr(+) and the voltage detection signal Vd(−) and outputs a voltage error amplification signal Ev. The control switching circuit SW takes as input the current error amplification signal Ei, the voltage error amplification signal Ev and the delay signal Tds. When the delay signal Tds is at high level (from the start of short circuit till the lapse of the delay period since the arc regeneration), the control switching circuit SW outputs the current error amplification signal Ei as the error amplification signal Ea. When the delay signal Tds is at Low level (arc), the control switching circuit SW outputs the voltage error amplification signal Ev as the error amplification signal Ea. By this circuit, constant-current control is executed during the short circuit period and the delay period, whereas constant-voltage control is executed during the arc period.

The counter circuit NC takes as input the constriction detection signal Nd. The counter circuit NC counts, in each predetermined cycle, how many times the length of the time for which the constriction detection signal Nd is at high level falls outside a predetermined range, and outputs a count signal Nc. A short circuit occurs about 20-100 times per second, depending on the average welding current.

As an example, it is now assumed that the average welding current is 230 A, short circuit occurs 30 times per second, and the above-described predetermined cycle is one second. (In practice, the occurrence frequency of short circuit varies in the range of about 25-35 times per second. The predetermined cycle is not limited to one second but may be e.g. 0.5-3 seconds.) In each time of short circuit, the constriction detection signal Nd keeps high level during a constriction detection period from when constriction is detected till when an arc is regenerated. In this example, short circuit occurs 30 times in each cycle, so that the number of constriction detection periods in each cycle is also 30. The thirty constriction detection periods can be expressed as Tn(1), Tn(2), . . . , Tn(30). Of the thirty constriction detection periods, the number of constriction detection periods the length of which falls outside a predetermined range is counted. For instance, the predetermined range may be 0.1-1 ms. Of the thirty constriction detection periods, the number of constriction detection periods the length of which is outside the range of 0.1-1 ms is counted. When the length of a constriction detection period is outside the predetermined range, it means that the constriction detection is erroneous.

A main cause for erroneous detection lies in that the formation state of the constriction in a molten droplet changes because of abrupt change in the feed rate by feed rate variable control. In the present invention, the above-described counting is performed not only in a single cycle, but also in each cycle because of the following reason: Generally, even when the feed rate is constant, erroneous constriction detection occurs at a low frequency. When the feed rate is abruptly changed, erroneous constriction detection occurs at a frequency higher than a certain level. As long as erroneous constriction detection occurs at a low frequency, it does not adversely affect the welding performance. However, when erroneous constriction detection occurs at a frequency higher than a certain level, it adversely affects the welding performance. By determining whether or not the frequency of erroneous constriction detection exceeds a certain level, whether or not the cause for erroneous detection is a rapid change in the feed rate is determined. Thus, the number of erroneous constriction detection is counted in each cycle in order to determine whether the frequency of erroneous detection exceeds a certain level.

The count comparator circuit CN takes the count signal Nc as input and outputs a count comparison signal Cn. The count comparison signal Cn changes from a low level to a high level when the value of the count signal Nc for each predetermined cycle exceeds a predetermined reference count. When the predetermined cycle is one second, the reference count is set to in a range of e.g. 3-10. For instance, when the reference count is set to five, the count comparison signal Cn is kept at high level for a predetermined short time when erroneous constriction detection has occurred five times or more within one second.

The gain setting circuit GR takes the count comparison signal Cn as input and outputs a gain setting signal Gr. The gain setting signal Or has a predetermined high gain setting value when the count comparison signal Cn is at low level. When the count comparison signal Cn is changed to high level, the gain setting signal Gr changes to a predetermined low gain setting value (lower than the high gain setting value) and keeps the low gain setting value until the welding is finished. The gain setting signal Gr is a signal that determines the gain of the feedback control system in feed rate variable control. Thus, the transient response time in the feed rate variable control becomes longer when the gain is reduced and becomes shorter when the gain is increased. During the period when the count comparison signal Cn is at low level from the start of the welding, the transient response of the feed rate variable control is at a high speed (transient response time is short). When the count comparison signal Cn is changed to a high level, the transient response of the feed rate variable control changes to a low speed (transient response time is long) and holds that state until the welding is finished. Each gain is set so that the transient response time (time constant) at the time of the low gain setting value be double or more than the transient response time at the time of the low gain setting value. For instance, the transient response time at the time of the high gain setting value is 100 ms, whereas the transient response time at the time of the low gain setting value is 500 ms.

The current setting circuit IR outputs a predetermined current setting signal Ir, which is the target current value in the feed rate variable control. The feed error amplification circuit EF takes as input the gain setting signal Or and outputs a feed error amplification signal Ef. The feed error amplification signal Ef is obtained by amplifying the error between the current setting signal Ir and the welding current smoothed signal Iav by the gain determined by the gain setting signal Gr. Proportional control (P control), proportional integral control (PI control) or proportional integral derivative control (PID control) is applicable to the feed error amplification circuit. Herein, the gain means proportional gain. The feed rate setting circuit FR integrates the feed error amplification signal Ef to output a feed rate setting signal Fr. The integration is performed during the welding and the relation $Fr=Fr0+\int Ef\cdot dt$ holds, where Fr0 is an initial value. The initial value Fr0 is set to a proper value in the range of about 6-10 m/min. Since the feed rate is determined when the value of the current setting signal Ir, the material and diameter of the welding wire and the chip-base distance at the start of the welding are determined, the feed rate may be utilized as the initial value Fr0. The feed control circuit FC takes as input the feed rate setting signal Fr and outputs a feed control signal Fc to the feed motor WM. The feed control signal Fc is a signal for feeding the welding wire 1 at a feed rate corresponding to the value of the feed rate setting signal Fr.

Figure 2:
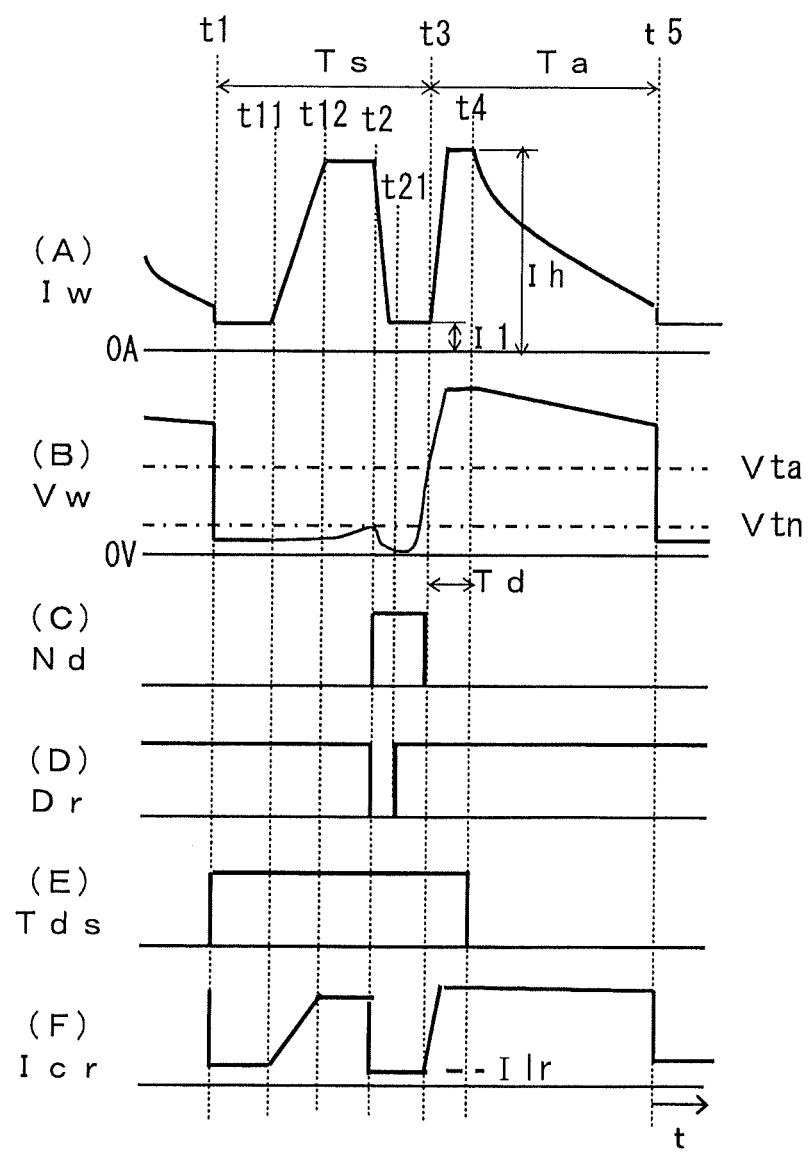
FIG. 2 is a timing chart of each signal in the welding power source shown in FIG. 1 for explaining the operation of the constriction detection control.

FIG. 2 is a timing chart of each signal in the welding power source shown in FIG. 1 for explaining the operation of the constriction detection control. In this figure, (A) shows the change of the welding current Iw with time, (B) shows the change of the welding voltage Vw with time, (C) shows the change of the constriction detection signal Nd with time, (D) shows the change of the driving signal Dr with time, (E) shows the change of the delay signal Tds with time, and (F) shows the change of the current control setting signal Icr with time.

(1) Operation from Time t1 (Short Circuit Occurs) to Time t2 (Constriction Detected)

At time t1, the welding wire 1 comes into contact with the base material 2, whereby short-circuiting state is provided, and the welding voltage Vw reduces sharply to a short circuit voltage of approximately several volts as shown in (B) in FIG. 2. When the welding voltage Vw is determined to have reduced below a short-circuit/arc determination value Vta, the delay signal Tds changes from a low level to a high level as shown in (E) in FIG. 2. In response to this, as shown in (F) in FIG. 2, the current control setting signal Icr changes from a predetermined high level current setting value to a predetermined initial current setting value lower than the high level current setting value. The current control setting signal Icr maintains the initial current setting value during the predetermined initial period between times t1 and t11, and rises with a predetermined short-circuit-time slope during the period between times t11 and t12 and maintains a predetermined peak setting value during the period between times t12 and t2.

During the short circuit period, constant-current control is executed as noted before, so that the welding current Iw is controlled to a value corresponding to the current control setting signal Icr. Thus, as shown in (A) in FIG. 2, the welding current Iw reduces sharply at time t1 from the welding current during the arc period, maintains the initial current during the initial period between times t1 and t11, increases with a short-circuit-time slope during the period between times t11 and t12 and maintains the peak value during the period between times t12 and t2. As shown in (B) in FIG. 2, the welding voltage Vw starts to increase at around time t12 when the welding current Iw reaches the peak value. This is because a constriction is formed in a molten droplet. As shown in (C) in FIG. 2, the constriction detection signal Nd is at low level during the period between times t1 and t2. As shown in (D) in FIG. 2, the driving signal Dr is at high level during the period between times t1 and t2. Thus, before time t2, the transistor TR (see FIG. 1) is in the on-state, so that the current reducing resistor R is short-circuited. In this state, the welding power source in the same state as that of an ordinary consumable electrode arc welding power source.

For instance, the initial period (t1-t11) is about 1 ms, the initial current is about 50 A, the short-circuit-time slope is about 100-300 A/ms, and the peak value is about 300-400 A.

(2) Operation from Time t2 (Constriction Detected) to Time t3 (Arc Regenerated)

As shown in (B) in FIG. 2, the welding voltage Vw, which has been increasing, reaches the predetermined constriction detection reference value Vtn at time t2, whereby a constriction is detected. Then, as shown in (C) in FIG. 2, the constriction detection signal Nd changes to a high level. In response to this, as shown in (D) in FIG. 2, the driving signal Dr changes to a low level, which shifts the transistor TR to the off-state. Thus, the current reducing resistor R is inserted in the current path. At the same time, as shown in (F) in FIG. 2, the current control setting signal Icr reduces to a low level current setting signal Ilr. As a result, as shown in (A) in FIG. 2, the welding current Iw reduces sharply from the peak value to a low level current Il (about 30 A). When the welding current Iw becomes the low level current Il at time t21, the driving signal Dr returns to the high level, as shown in (D) in FIG. 2. As a result, the transistor TR shifts to the on-state, whereby the current reducing resistor R is short-circuited. Since the current setting signal Ir is maintained at the low level current setting signal Ilr, the welding current Iw maintains the low level current Il till time t3 (arc regeneration), as shown in (A) in FIG. 2. Thus, the transistor TR is in the off-state only during the period between time t2 and time t21. As shown in (B) in FIG. 2, the welding voltage Vw reduces from time t2 and then increases sharply.

(3) Operation from Time t3 (Arc Regenerated) to Time t4 (End of Delay Period Td)

When arc is regenerated at time t3, as shown in (B) in FIG. 2, the welding voltage Vw exceeds the short-circuit/arc determination value Vta. In response to this, as shown in (F) in FIG. 2, the current control setting signal Icr rises from the low level current setting signal Ilr with a predetermined arc-time slope. After reaching the high level current setting value, the current control setting signal Icr maintains the value. As shown in Fig. (E) in FIG. 2, the delay signal Tds is maintained at high level during a predetermined delay period Td between times t3 (arc regeneration) and t4. Thus, since the power source main circuit PM is subjected to constant-current control till time t4, as shown in (A) in FIG. 2, the welding current Iw increases from time t3 with an arc-time slant, and after reaching the high level current, maintains the value till time t4. As shown in (B) in FIG. 2, the welding voltage Vw is maintained at high level during the delay period Td (t3-t4). For instance, the delay period Td is about 2 ms. As shown in (C) in FIG. 2, the constriction detection signal Nd changes to a low level when an arc is regenerated (i.e., time t3). The length of the period (t2-t3) during which the constriction detection signal Nd is at high level is measured. Whether or not the length of the period is outside the above-described predetermined range is determined, and when the length is outside the predetermined range, counting is performed with respect to each cycle described above.

(4) Operation During Arc Period Between Time t4 (End of Delay Period Td) and Time t5 (Next Short-Circuit Occurs)

As shown in (E) in FIG. 2, the delay signal Tds changes to a low level at time t4. In response to this, the power source main circuit PM is shifted from constant-current control to constant-voltage control. As a result, as shown in (A) in FIG. 2, the welding current Iw gradually reduces from the high level current in accordance with the arc load. Similarly, as shown in (B) in FIG. 2, the welding voltage Vw gradually reduces from the high level voltage in accordance with the reduction of the arc length.

In this way, in the constriction detection control, the current reducing resistor R is inserted in the current path when a constriction is detected at time t2, whereby the welding current Iw is sharply reduced. Thus, regeneration of an arc occurs with the current held at a low value, which leads to considerable reduction of spattering.

Figure 3:
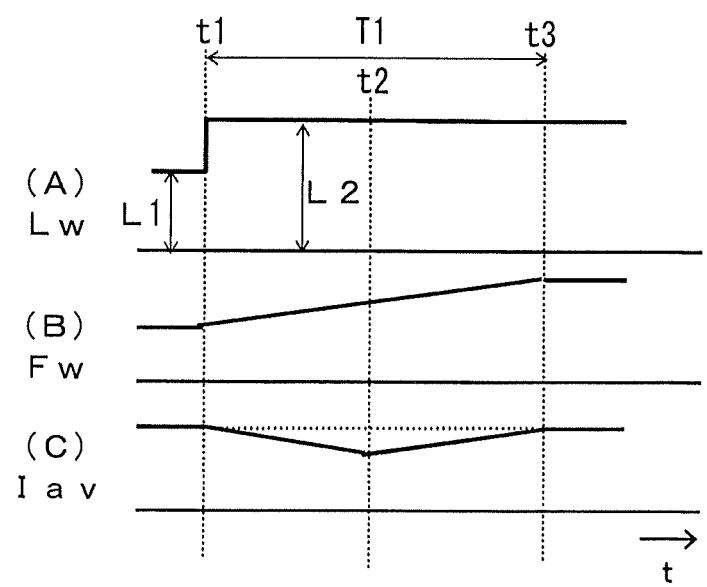
FIG. 3 is a timing chart of each signal in the welding power source shown in FIG. 1 for explaining the operation of feed rate variable control.

FIG. 3 is a timing chart of each signal in the welding power source shown in FIG. 1 for explaining the operation of feed rate variable control. In this figure, (A) shows the change of the chip-base distance Lw with time, (B) shows the change of the feed rate Fw with time, and (C) shows the change of the welding current smoothed signal Iav with time. FIG. 3 shows the transient response of the feed rate Fw and the welding current smoothed signal Iav when the chip-base distance Lw is increased (L1<L2) during the welding.

Specifically, when the welding torch 4 is moved away from the base material 2 at time t1 during welding, the chip-base distance Lw increases from L1 (mm) to L2 (mm) as shown in (A) in FIG. 3. As a result, as shown in (C) in FIG. 3, the value of the welding current smoothed signal Iav, which has been constant, starts to reduce with a predetermined slope at time t1. To maintain the welding current smoothed signal Iav constant, feed rate variable control is executed. As shown in (B) in FIG. 3, the feed rate Fw is increased from time t1 with a predetermined slope. As shown (C) in FIG. 3, this causes the value of the welding current smoothed signal Iav to change from decrease to increase at time t2 and return at time t3 to the value at time t1 (and before time t1). The feed rate Fw starts to increase at time t1 and continues to increase at time t2. Thus, at time t3, the feed rate Fw has a value higher than that before time t1. The period t1-t3 is the transient response time T1 (second). This transient response time T1 is set by the value of the above-described gain setting signal Gr. For instance, the transient response time T1 is 100 ms when the value of the gain setting signal Gr is a high gain setting value and 500 ms when the value of the gain setting signal Gr is a low gain setting value.

The short circuit period t1-t3 shown in FIG. 2 is about 4 ms, and the arc period t3-t5 shown in FIG. 2 is about 21 ms.

Since the transient response time T1 shown in FIG. 3 is about 100-500 ms, short-circuit and arc are repeated 4-20 times within the transient response time T1.

Feed rate variable control maintains the welding current smoothed value constant even when the chip-base distance is changed, to make the penetration depth uniform.

When welding is performed while executing constriction detection control and feed rate variable control at the same time, welding performance may become unstable because of the following reason. When the chip-base distance Lw is changed by a large amount in a short time, the feed rate sharply changes by feed rate variable control, which changes the formation state of a constriction in a molten droplet. This causes constriction detection control to operate improperly, which results in unstable welding performance. That is, improper operation of constriction detection control occurs when the length of the constriction detection period falls outside a predetermined range and provides almost no spatter reducing effects and makes the transfer state of a molten droplet unstable. Whether or not improper operation of constriction detection control occurs depends on various welding conditions such as the changing manner of the chip-base distance Lw, the welding current average value or the welding speed. When improper operation of constriction detection control occurs, adverse effect by such improper control operation can be prevented by increasing the transient response time (low speed response) of feed rate variable control and thereby moderating the change of the feed rate. However, to increase the effect of feed rate variable control, it is desirable that the transient response time is short (high speed response). In view of these, according to this embodiment, welding is performed while executing both of constriction detection control and feed rate variable control, and transient response of feed rate variable control is set to a high speed at the start of the welding. When erroneous constriction detection occurs at a frequency higher than a predetermined frequency during the welding, the transient response of feed rate variable control is set to a low speed, thereby preventing adverse effect by improper operation of constriction detection control. According to this arrangement, when improper operation of constriction detection control does not occur, the transient response of feed rate variable control is at high speed. Thus, the effect of constriction detection control and feed rate variable control are achieved as much as possible. When improper operation of constriction detection control occurs, the transient response of feed rate variable control is changed to a low speed. This prevents unstable welding and poor welding quality, though the effect of feed rate variable control is degraded.

In the above-described embodiment, switching of the transient response of the feed rate variable control to high speed or low speed is realized by switching the gain of the feed rate variable control system. Alternatively, switching of the transient response of the feed rate variable control to high speed or low speed may be realized by changing the time constant of the welding current smoothed value. In this case, operation of the current smoothing circuit IAV shown in FIG. 1 is changed as follows. The current smoothing circuit IAV takes as input the current detection signal Id and the count comparison signal Cn. When the count comparison signal Cn is at low level, the current smoothing circuit IAV sets the time constant of the smoothing to a predetermined first time constant. When the count comparison signal Cn is changed to a high level, the current smoothing circuit IAV sets the time constant of the smoothing to a predetermined second time constant (having a value greater than that of the first time constant) and maintains the value till the welding is finished. In this way, the current smoothing circuit IAV smoothes the current detection signal Id at a set time constant to output a welding current smoothed signal Iav.

In the foregoing embodiment, the transient response of the feed rate variable control is switched from high speed to low speed when the count comparison signal Cn is changed to a high level. This switching may be performed every time the count comparison signal Cn changes to a high level. For instance, the transient response time T1 when the count comparison signal Cn is at low level may be set to 100 ms, and the transient response time T1 may be made longer by 100 ms every time the count comparison signal Cn is changed to a high level. In this case, the transient response time changes to 200 ms (100 ms+100 ms) when the count comparison signal Cn is changed to a high level for the first time and changed to 300 ms (200 ms+100 ms) when the count comparison signal Cn is changed to a high level for the second time.

The invention claimed is:

1. A consumable electrode arc welding method comprising:
   a constriction detection step of short-circuiting a welding wire and a base material during a short circuit period, detecting a constriction formed in a molten droplet of the welding wire, reducing a welding current through the welding wire and the base material based on detection of the constriction and causing an arc to be generated between the welding wire and the base material after the welding current is reduced;
   a smoothed value detection step of detecting a smoothed value of the welding current; and
   a feedback step of feedback controlling a feed rate of the welding wire to make the smoothed value of the welding current correspond to a predetermined current setting value;
   wherein during the short circuit period and prior to detecting the constriction, maintaining the smoothed value of the welding current at a peak value for a period of time up to detecting the constriction;
   wherein the constriction detection step is performed repetitively in a predetermined cycle and in each time of repetition a constriction time length from when the constriction is detected till when the arc is generated is measured,
   of the constriction time lengths obtained in the predetermined cycle, the number of constriction time lengths falling outside a predetermined constriction reference range is counted, and
   when the counted number is smaller than a predetermined reference number, transient response time of the feedback control regarding the feed rate of the welding wire is set to a predetermined value, and when the counted number is not less than the reference number, the transient response time of the feedback control regarding the feed rate of the welding wire is set to a value larger than the predetermined value.

2. The consumable electrode arc welding method according to claim 1, wherein the transient response time is set by changing gain of the feedback control.

3. The consumable electrode arc welding method according to claim 1, wherein the transient response time is set by changing a time constant of the smoothed value of the welding current.

4. The consumable electrode arc welding method according to claim 1, wherein during the short circuit period and prior to detecting the constriction, maintaining the smoothed value of the welding current at an initial current for a period of time from the start of the short circuit period, and thereafter increasing the smoothed value of the welding current at a constant rate up to the peak value.

5. The consumable electrode arc welding method according to claim 1, wherein when the constriction is detected a constriction detection signal changes from a first level to a second level higher than the first level and a driving signal changes from a third level to a fourth level that is lower than the third level, and the driving signal changes from the fourth level back to the third level before the constriction detection signal changes from the second level back to the first level.

* * * * *